United States Patent
Choi

(10) Patent No.: US 8,563,070 B2
(45) Date of Patent: Oct. 22, 2013

(54) METHOD OF MANUFACTURING CITRUS SNACK USING REDUCED PRESSURE DRYING

(75) Inventor: Young Beom Choi, Jeju-si (KR)

(73) Assignee: O'Jeju Agro Foodtech Holdings, Inc., Jeju-si (KR)

( * ) Notice: Subject to any disclaimer, the term of this patent is extended or adjusted under 35 U.S.C. 154(b) by 270 days.

(21) Appl. No.: 13/083,143

(22) Filed: Apr. 8, 2011

(65) Prior Publication Data

US 2011/0250329 A1   Oct. 13, 2011

(30) Foreign Application Priority Data

Apr. 9, 2010   (KR) .......................... 10-2010-0032833

(51) Int. Cl.
   *A23B 7/02*   (2006.01)
(52) U.S. Cl.
   USPC ........... 426/616; 426/640; 426/464; 426/465; 426/518; 426/520; 426/524
(58) Field of Classification Search
   USPC ......... 426/616, 640, 443, 455, 456, 464, 465, 426/518, 520, 524; 99/472
   See application file for complete search history.

(56) References Cited

U.S. PATENT DOCUMENTS

| | | | | |
|---|---|---|---|---|
| 1,717,489 A * | 6/1929 | Barlow | ......................... | 426/640 |
| 1,929,437 A * | 10/1933 | McComb | ...................... | 426/473 |
| 2,145,495 A * | 1/1939 | Paxton | ............................ | 34/333 |
| 2,379,068 A * | 6/1945 | Derby | ............................ | 426/333 |
| 2,504,946 A * | 4/1950 | Doolittle | ........................ | 209/45 |
| 3,511,671 A * | 5/1970 | Miles | ............................ | 426/319 |
| 4,329,789 A * | 5/1982 | Erickson | ....................... | 34/195 |
| 4,352,249 A * | 10/1982 | Rose | ............................... | 34/212 |
| 4,421,020 A * | 12/1983 | Gross | ............................. | 99/472 |
| 4,713,252 A * | 12/1987 | Ismail | ........................... | 426/290 |
| 4,777,734 A * | 10/1988 | Elferink | ......................... | 34/467 |
| 4,814,190 A * | 3/1989 | Ismail | ............................ | 426/102 |
| 5,000,972 A * | 3/1991 | Nafisi-Movaghar | .......... | 426/333 |
| 5,188,861 A * | 2/1993 | Mazin et al. | .................. | 426/640 |
| 5,386,766 A * | 2/1995 | Segredo et al. | ............... | 99/495 |
| 6,268,012 B1 * | 7/2001 | Sikora et al. | ................. | 426/640 |
| 6,442,866 B2 * | 9/2002 | Wefers | .............................. | 34/263 |
| 2010/0055263 A1* | 3/2010 | Erle et al. | ...................... | 426/289 |

* cited by examiner

*Primary Examiner* — Drew E Becker
(74) *Attorney, Agent, or Firm* — McDermott Will & Emery LLP

(57) ABSTRACT

Disclosed herein is a method of manufacturing citrus snacks. In this method, citrus fruits are sliced in a natural state and dried under reduced pressure so that the citrus fruits may be dried while containing the same nutrients as when fresh, thereby avoiding nutritional damage due to high temperature drying. Further, the citrus fruits containing various nutrients are provided to users in a snack form that allows more convenient ingestion, so that the citrus fruits may be easily ingested by children and the elderly to whom the supply of nutrition is essential.

2 Claims, 5 Drawing Sheets

METHOD OF MANUFACTURING CITRUS SNACK USING REDUCED PRESSURE DRYING

TECHNICAL FIELD

The present invention relates to a method of manufacturing citrus snacks using reduced pressure drying, in which pressure, temperature and moisture in a drying machine are kept in a certain equilibrium state to enhance evaporation of moisture by decompression at low temperature, thereby allowing high quality, rapid and uniform drying without loss of taste, flavor, nutrition, color and without tissue damage.

BACKGROUND ART

Unlike general vacuum drying, according to the present invention, pressure is generated by means of a fan that sucks air to attain a pressure of 980 hPa, moisture in the original material is uniformly evaporated, and the evaporated moisture is also discharged to the outside by the fan. With this configuration, it is possible to manufacture a snack, having the same shape as a slice of the citrus fruit produced using a slicing machine, without loss of flavor, nutrition, and so on.

DISCLOSURE

Technical Problem

The present invention is conceived to solve the above problems, and an object of the invention is to provide a method of manufacturing citrus snacks using reduced pressure drying, in which citrus fruits are sliced in a natural state and dried under reduced pressure so that the citrus slices may be dried while maintaining the original nutritional properties thereof without nutritional loss encountered upon high temperature drying, and by which the citrus fruits containing various kinds of nutritional elements are provided to users in a snack form that allows more convenient ingestion than the original citrus fruits, so that the citrus fruits may be pleasing to children and the elderly to whom the supply of nutrition is essential.

Technical Solution

In order to accomplish the above and other objects, the present invention has the following features.

In accordance with one aspect of the invention, a method of manufacturing citrus snacks using reduced pressure drying includes: selecting citrus fruits based on size using a conveyor capable of classifying citrus fruits according to size; supplying a fine flow of compressed air onto the selected citrus fruits to remove impurities from surfaces of the citrus fruits, spraying compressed water onto the citrus fruits to wash them, and supplying compressed air onto the washed citrus fruits to remove moisture from the surfaces thereof; cutting the washed citrus fruits in a horizontal or vertical direction to a thickness of 1 mm to 5 mm and selecting citrus slices having a predetermined diameter or more; putting a drying tray into a drying machine with the cut and selected citrus slices placed on the drying tray to perform a drying process on the citrus slices; and discharging the drying tray from the drying machine and then naturally cooling the dried citrus slices at room temperature.

A circulating fan may be provided to one side within the drying machine to introduce external air into the drying machine, and a decompressing fan may be provided to one side of the drying machine to discharge internal air of the drying machine to the outside in order to reduce the pressure in the drying machine. The decompressing fan may maintain the pressure in the drying machine between 900 hPa and 1000 hPa. The drying process includes a first drying stage of drying the citrus slices in the drying machine at a temperature between 25° C. and 35° C. for 4 hours; a second drying stage of drying at a temperature between 30° C. and 40° C. for 3 hours; a third drying stage of drying at a temperature between 35° C. and 40° C. for 2 hours; a fourth drying stage of drying at a temperature between 30° C. and 40° C. for 3 hours; and a fifth drying stage of drying at a temperature between 35° C. and 45° C. for 2 hours, such that the content of moisture in the citrus slices becomes 7% to 9%.

The drying tray may have a plate shape with a net structure that allows air communication in a vertical direction, and a support plate may be disposed under the drying tray to support the drying tray. Here, the support plate has an inclined surface at a central region thereof to promote air flow in a vertical direction of the drying tray.

After cooling the dried citrus slices, the method may further include selectively removing citrus slices having a moisture content of less than 7% or greater than 9% and citrus slices that do not have a circular shape due to partial damage during the preceding steps including the cooling step; and packaging the citrus slices after the step of selectively removing the citrus slices.

Advantageous Effects

According to the present invention, citrus fruits are sliced in a natural state and then dried under reduced pressure so that the citrus slices may be dried while maintaining the original nutritional properties thereof without nutritional loss encountered upon high temperature drying.

In addition, the citrus fruits containing various kinds of nutritional elements are provided to users in a snack form that allows more convenient ingestion than the original citrus fruits so that the citrus fruits may be pleasing to children and the elderly to whom the supply of nutrition is essential.

Further, since citrus fruits are dried, made into a snack form and stored instantly after being harvested, the citrus fruits can be prevented from being damaged due to long-term storage and solve the problems caused by the shortage of preservation place and equipment, and it is also possible to provide consumers with processed citrus products containing an abundance of nutrition in season and out of season.

BEST MODE

Hereinafter, citrus snacks according to the invention will be described in detail with reference to the accompanying drawings.

Figure 1:
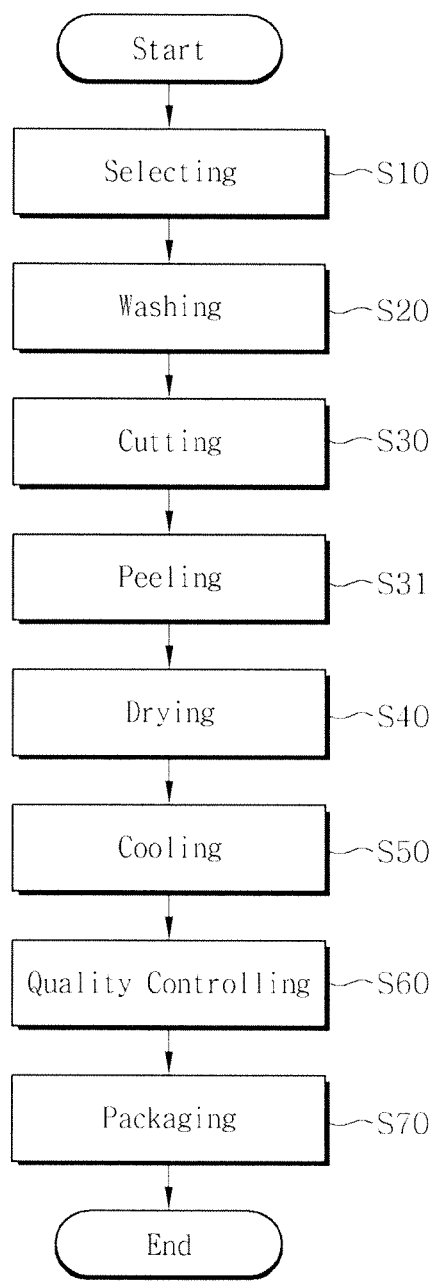
FIG. 1 is a flowchart of a method of manufacturing citrus snacks according an embodiment of the present invention.
Figure 2:
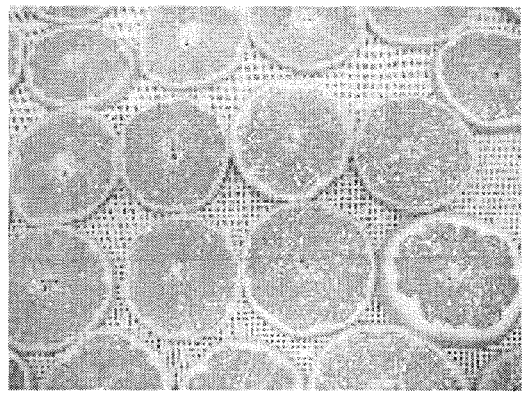
FIG. 2 is a photograph of citrus slices arranged on a drying tray, which are produced by the method according to the embodiment of the present invention.
Figure 3:
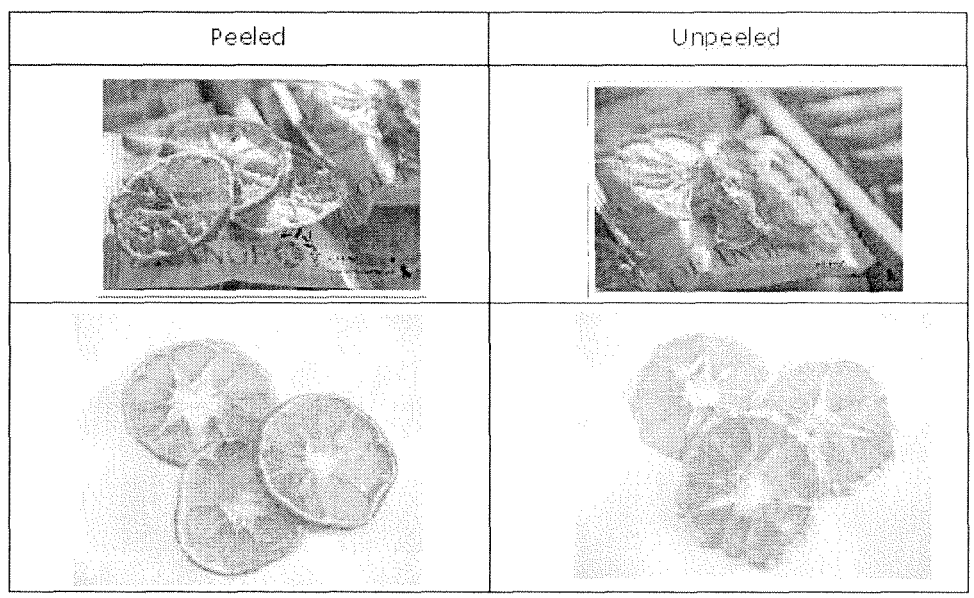
FIG. 3 shows photographs of the dried citrus slices in unpeeled and peeled states, which are produced by the method according to the embodiment of the present invention.
Figure 4:
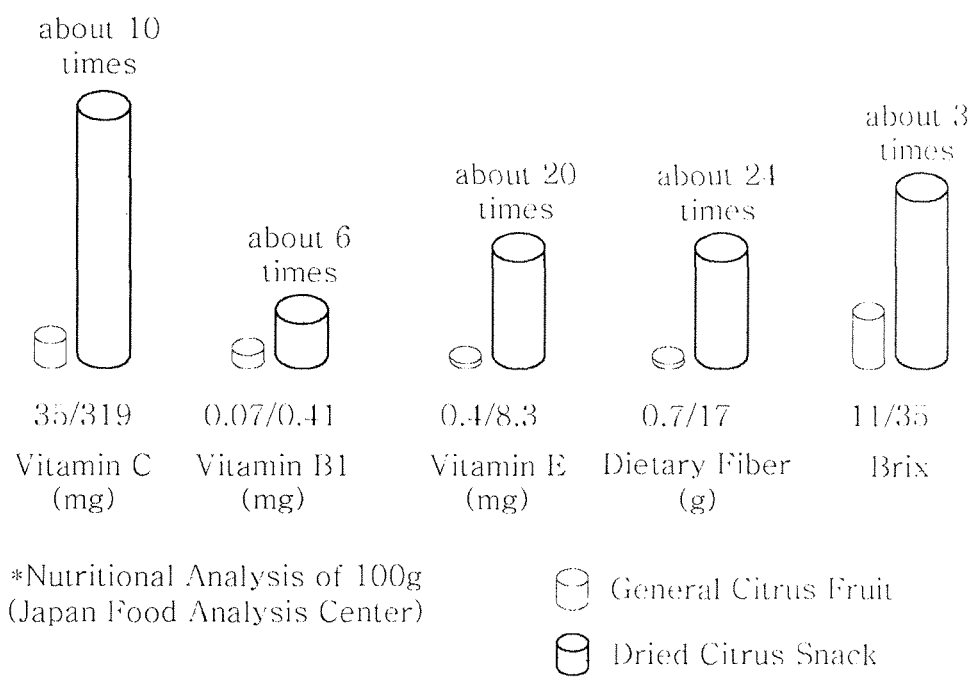
FIG. 4 is a graph depicting contents of various nutrients in the dried citrus snacks produced by the method according to the embodiment of the present invention, and general citrus fruits.

FIG. 1 is a flowchart of a method of manufacturing citrus snacks according an embodiment of the invention; FIG. 2 is a photograph of citrus slices arranged on a drying tray, which are produced by the method according to the embodiment; FIG. 3 shows photographs of the dried citrus slices in unpeeled and peeled states, which are produced by the method according to the embodiment; and FIG. 4 is a graph depicting contents of various nutrients in the dried citrus snacks produced by the method according to the embodiment, and general citrus fruits.

Figure 5:
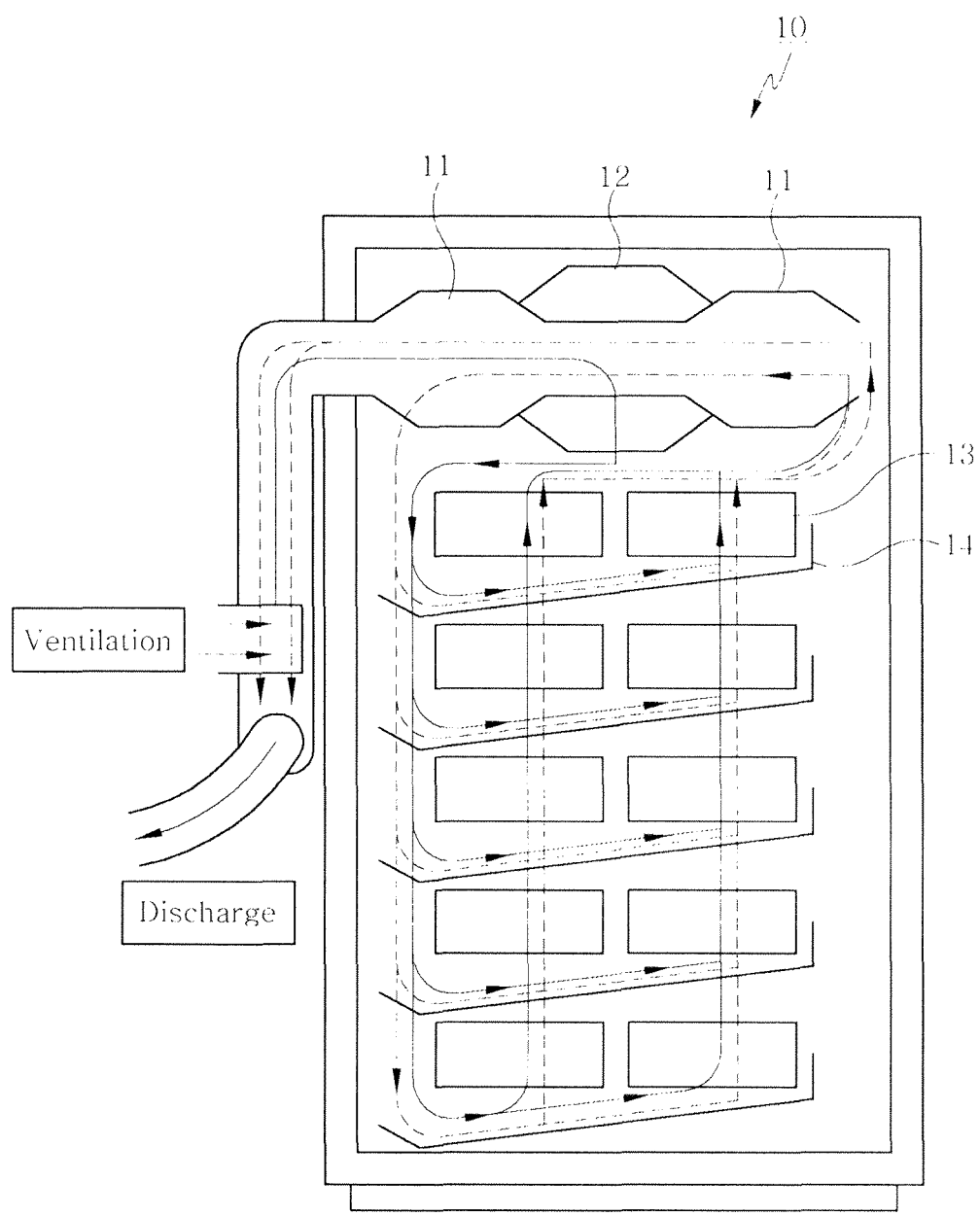
FIG. 5 is a schematic sectional view of a drying machine according to an embodiment of the present invention.
Figure 6:
FIG. 6 is a photograph of the drying machine according to the embodiment of the present invention.

Further, FIG. 5 is a schematic sectional view of a drying machine according to an embodiment of the invention, and FIG. 6 is a photograph of the drying machine according to the embodiment of the invention.

Referring to the drawings, a method of manufacturing citrus snacks according to the invention generally includes a selection step S10 of selecting citrus fruits based on size using a carrying conveyor capable of classifying citrus fruits according to size; a washing step S20 of supplying a fine flow of compressed air onto the selected citrus fruits to remove impurities from surfaces thereof, spraying compressed water onto the citrus fruits to wash the citrus fruits, and supplying compressed air onto the washed citrus fruits to remove moisture from the surfaces thereof; a cutting step S30 of cutting the washed citrus in a horizontal or vertical direction to a thickness of 1 mm to 5 mm and selecting citrus slices with a predetermined diameter or more; a drying step S40 of putting a drying tray into a drying machine with the cut and selected citrus slices placed on the drying tray to perform a drying process on the citrus slices; and a cooling step S50 of discharging the drying tray from the drying machine and then naturally cooling the dried citrus slices at room temperature.

Here, in the selection step S10, natural citrus fruits are transported to a work site for producing dried citrus snacks, and classified according to the size thereof. When selecting the citrus fruits based on the size, a worker may manually select the citrus fruits or may use a measuring device. Alternatively, while the citrus fruits are carried on a conveyor, the citrus fruits may be automatically selected by changing their moving path according to the size by means of a sensor provided to one side of the carrying conveyor.

The selection step S10 may further include an operation of detecting a citrus fruit, which is damaged or has gone bad, by a worker or a specific sensor, and removing the damaged or bad citrus fruit. The criterion on the degree of damage or badness may be set by a worker.

In the selection step, citrus fruits having a diameter of 50 mm to 80 mm may be selected in consideration of the gripping of snacks, packaging limit, and ease of ingestion.

Meanwhile, the citrus fruits selected in the selection step S10 are washed in the washing step S20. In more detail, the washing step S20 is a three-stage washing process.

First, a fine flow of compressed air is sprayed onto the outer surfaces of the citrus fruits to remove impurities from the surfaces of selected citrus fruits to remove relatively great impurities firstly.

Then, compressed water is sprayed. Here, the compressed water may be mixed with electrolyzed water, which is used as a substitute for chemical materials, such as sterilizers, disinfectants, detergents, cleansers, waxes, and agricultural chemicals, such that the surfaces of the citrus fruits may be washed and sterilized at the same time.

Finally, compressed air is sprayed onto the washed citrus fruits to remove the moisture on the surfaces thereof left behind by the water.

Here, if pressure is intensively applied to one side of a citrus fruit when the fine flow of compressed air, compressed water or compressed air is sprayed, the citrus fruit can be damaged or not entirely washed. To solve this problem, it is preferred to allow citrus fruits to rotate according to a spraying direction of the spraying device such that spraying is performed uniformly in all directions.

The washing step S20 may be performed on the conveyor where the selection step S10 is performed. At this time, since it is difficult to rotate the citrus fruits, the spraying device may have a plurality of spray nozzles to perform spraying in various directions. Alternatively, one or two spray nozzles may spray the fine flow of compressed air, compressed water or compressed while rotating along a certain trajectory.

Meanwhile, the washed citrus fruits are cut in a horizontal or vertical direction to a thickness of 1~5 mm, and cut citrus slices having a predetermined diameter or above are selected in the cutting step S30. In this embodiment, citrus fruits may be cut in a horizontal direction so as to enhance aesthetics and ensure less damage to the citrus slices during the cutting work.

In addition, after cutting washed citrus fruits, a peeling step S31 may be performed depending on whether the peel of the sliced citrus fruits is to be removed. The peel of citrus fruits has a wide variety of vitamins and various minerals, and thus it may be more advisable in terms of beneficial health effects to eat the peel.

If the peeling step S31 is not performed, the washing step S20 is performed. However, if the peeling step is performed, the washing step S20 may be eliminated, as necessary. In addition, the peeling operation may be formed before the washing step S20 and after the selection step S10.

Meanwhile, the drying step S40 is performed for reduced pressure drying of the cut citrus slices. The drying step S40 may be performed by placing and drying the citrus slices in a drying machine or chamber where a drying environment for decompression may be provided.

In one embodiment of the invention, the drying step is performed using a drying machine 10.

The reduced pressure drying environment according to one embodiment of the invention includes a drying tray 13 on which citrus slices are placed, a drying machine 10 that receives the drying tray 13, a decompressing fan 11 for reducing pressure of the drying machine 10, a circulating fan 12 for introducing external air into the drying machine 10, and a support plate 14 for supporting the drying tray 13 and having an inclined surface to increase drying efficiency.

The drying tray 13 may be arranged such that the citrus slices are adjacent to or in close contact with each other, in order to maximize space efficiency when the citrus slices are placed on the drying tray 13, as shown in FIG. 2.

The support plate 14 includes a central surface formed to have an inclined surface and two sides formed vertically to be perpendicular to the inclined surface so that the drying tray is supported.

As shown in FIG. 5, as the air introduced to one side of the above support plate 14 by the structure thereof is guided along the inclined surface, the air smoothly flows to the upper portion of the drying tray 13.

Further, the pressure reduction in the drying machine 10 is controlled by a discharge pressure of the decompressing fan 11. In the present invention, the pressure reduction in the drying machine is preferably kept in the range of 900 hPa to 1000 hPa, and in more detail, the discharged air of the decompressing fan 11 and the introduced air of the circulating fan 12 are controlled such that the pressure is kept at 980 hPa.

Here, the circulating fan 12 is provided to introduce external air, and the decompressing fan 11 and the circulating fan 12 are rotated in different directions to cause heat by air collision. In this invention, the heat generated by air collision is used as a heat source to control the temperature in the drying machine, and thus it is possible to control pressure, temperature, and humidity by using the operation energy of the circulating fan 12 and the decompressing fan 11 without any separate energy source.

The citrus slices in the drying machine are dried using the heat generated by air interference of the decompressing fan 11 and the circulating fan 12, and the evaporated moisture generated by drying is discharged when the air is discharged.

According to one embodiment, the heating environment in the drying machine of the embodiment includes a drying process comprising five stages as follows:

A first drying stage of drying the citrus slices in the drying machine at a temperature between 25° C. and 35° C. for 4 hours; a second drying stage of drying at a temperature between 30° C. and 40° C. for 3 hours; a third drying stage of drying at a temperature between 35° C. and 40° C. for 2 hours; a fourth drying stage of drying at a temperature between 30° C. and 40° C. for 3 hours; and finally a fifth drying stage of drying at a temperature between 35° C. and 45° C. for 2 hours.

Of course, the temperatures of the heating environment are preferably kept at 30° C., 35° C., 37° C., 35° C., and 40° C. in the first to fifth stages of the drying step, respectively.

Accordingly, moisture content of the citrus slices arranged on the drying tray 13 falls to 7% to 9%. If moisture content is less than 7%, the drying time or the drying temperature of a specific drying step may be decreased. If moisture content is greater than 9%, the drying time or the drying temperature of a specific drying step may be increased.

The temperature, time, and decompression of the drying steps may be suitably adjusted by a worker as necessary. Based on several verifications according to the embodiment, it was found that the moisture content was within a range of 7% to 9% when the pressure in the drying machine was 980 hPa and the first to fifth stages of the drying step were performed at 30° C. (4 hours), 35° C. (3 hours), 37° C. (2 hours), 35° C. (3 hours), and 40° C. (2 hours), respectively.

Finally, after the drying step S40, a cooling step S50 is performed to allow the citrus slices to be naturally cooled at room temperature after being discharged from the drying machine 10. In order to enhance cooling efficiency, a separate blower may be provided to reduce cooling time.

Meanwhile, after the cooling step S50, a quality control step S60 is performed to selectively remove citrus slices, which have a moisture content of less than 7% or greater than 9% and do not have a circular shape due to partial damage in the preceding steps such as the cooling step S50.

In the quality control step S60, a worker may manually determine whether a citrus slice on the conveyor is damaged and then remove the damaged slice, or an additional sensing means may be provided to sense citrus slices not having a circular shape within a predetermined diameter range so that non-circular slices may be removed.

In addition, the moisture content is measured using an additional moisture measuring device. Further, since it is inefficient to measure all of the carried citrus slices, it is preferred to sample and measure a suitable number of slices and estimate a moisture value of a sample group based on the sampled measurement result.

Thereafter, the quality control step S60 is completed, and a packing step S70 is performed to package the citrus slices according to size or capacity. The packing step S70 may be performed using a three-stage processing method.

The dried citrus snack produced by the manufacturing method of the present invention contains 319 mg of vitamin C per 100 g, which is about 10 times that of a general original citrus fruit (35 mg). Also, the dried citrus snack contains 0.41 mg of vitamin B1, which is about 6 times that of a general original citrus fruit (0.07 mg), 8.3 mg of vitamin E, which is about 20 times that of a general original citrus fruit (0.4 mg), 17 g of dietary fiber, which is about 24 times that of a general original citrus fruit (0.7 g), and 35 of Brix, which is about 3 times that of a general original citrus fruit (11).

Although the discussion above refers to citrus, the method of manufacturing citrus snacks using reduced pressure drying according to the embodiments of the invention may also be applied to other fruits, such as grapefruits, lemons, apples, and pears and vegetables, kimchi, or the like to produce dried snacks corresponding thereto Although the present invention has been described with reference to the embodiments shown in the drawings, it should be understood by those skilled in the art that these embodiments are given by way of illustration only, and that various modifications, changes, and alterations can be made without departing from the spirit and scope of the invention. Therefore, the scope of the invention should be limited only by the accompanying claims and equivalents thereof.

The invention claimed is:

1. A method of manufacturing citrus snacks using reduced pressure drying, comprising:

selecting citrus fruits based on size using a conveyor capable of classifying citrus fruits according to size;

supplying a fine flow of compressed air onto the selected citrus fruits to remove impurities from surfaces of the citrus fruits, spraying compressed water onto the citrus fruits to wash them, and supplying compressed air onto the washed citrus fruits to remove moisture from the surfaces thereof;

cutting the washed citrus fruits in a horizontal or vertical direction to a thickness of 1 mm to 5 mm and selecting citrus slices having a predetermined diameter or more;

putting a drying tray into a drying machine with the cut and selected citrus slices placed on the drying tray to perform a drying process on the citrus slices; and discharging the drying tray from the drying machine and then naturally cooling the dried citrus slices at room temperature, wherein a circulating fan is provided at one side within the drying machine to introduce external air into the drying machine, and a decompressing fan is provided at the one side of the drying machine to discharge internal air of the drying machine to the outside in order to reduce pressure in the drying machine, the decompressing maintaining the pressure in the drying machine between 900 hPa and 1000 hPa;

wherein in the drying process, the citrus slices in the drying machine are dried using heat generated by air interference of the decompressing fan and the circulating fan, and evaporated moisture generated by drying is discharged when the air is discharged;

wherein the drying process includes a first drying stage of drying the citrus slices at a temperature between 25° C. and 35° C. for 4 hours; a second drying stage of drying at a temperature between 30° C. and 40° C. for 3 hours; a third drying stage of drying at a temperature between 35° C. and 40° C. for 2 hours; a fourth drying stage of drying at a temperature between 30° C. and 40° C. for 3 hours; and a fifth drying stage of drying at a temperature between 35° C. and 45° C. for 2 hours, such that the content of moisture in the citrus slices becomes 7% to 9%; and wherein the drying tray has a plate shape with a net structure that allows air communication in a vertical direction, and a support plate is disposed under the drying tray to support the drying tray, the support plate having an inclined surface at a central region thereof to promote air flow in a vertical direction of the drying tray.

2. The method according to claim 1, further comprising:

after cooling the dried citrus slices, selectively removing citrus slices having a moisture content of less than 7% or greater than 9% and citrus slices that do not have a circular shape due to partial damage during the preceding steps including the cooling step; and packaging the citrus slices after the step of selectively removing the citrus slices.

* * * * *